United States Patent
Livingston (10) Patent No.: US 9,910,854 B2
(45) Date of Patent: Mar. 6, 2018

(54) MANAGING EMBEDDED DIGITAL SIGNATURE LOCATIONS IN A STREAM OF DATA FILES

(71) Applicant: CA, Inc., New York, NY (US)

(72) Inventor: Michael Livingston, Herndon, VA (US)

(73) Assignee: CA, Inc., Islandia, NY (US)

(*) Notice: Subject to any disclaimer, the term of this patent is extended or adjusted under 35 U.S.C. 154(b) by 559 days.

(21) Appl. No.: 14/589,236

(22) Filed: Jan. 5, 2015

(65) Prior Publication Data

US 2016/0196273 A1    Jul. 7, 2016

(51) Int. Cl.
*G06F 17/00*    (2006.01)
*G06F 17/30*    (2006.01)

(52) U.S. Cl.
CPC ...... *G06F 17/30073* (2013.01); *G06F 17/301* (2013.01)

(58) Field of Classification Search
CPC .......... G06F 17/30867; G06F 17/2247; G06F 17/30616; G06F 17/30716; G06F 17/30849
See application file for complete search history.

(56) References Cited

U.S. PATENT DOCUMENTS

2015/0356123 A1* 12/2015 Gorelik ............. G06F 17/30539
715/765

* cited by examiner

*Primary Examiner* — Truong Vo
(74) *Attorney, Agent, or Firm* — Stevens & Showalter, LLP (57) ABSTRACT

According to aspects of the present disclosure, archived system management facility (SMF) data may be verified against a signature, even if the data to be verified against the signature is split among two or more history files. When archiving an SMF data dump, an indication is kept that includes locations of signatures found while a system management facility (SMF) data dump is being archived. For example, the indication may be kept in metadata of the history file (e.g., in the history file itself, a status block outside the history file, a collective index, etc.). Then when extracting the archived data, if the data corresponding to a signature is in a different history file, the data corresponding to the signature from all of the history files is concatenated for verification.

19 Claims, 4 Drawing Sheets

MANAGING EMBEDDED DIGITAL SIGNATURE LOCATIONS IN A STREAM OF DATA FILES

BACKGROUND

Various aspects of the present invention relate generally to archiving and extracting system management facility (SMF) data and more specifically to archiving and extracting SMF data that includes signatures.

SMF data provides a method for archiving computer (e.g., mainframe computer) activity records to history files for later extraction. Activities that are archived include I/O activity, network activity, error conditions, etc. A specific time-slice of SMF data generated on a single system to be archived in one or more history files is called a dump. Further, the SMF data dump may include signatures that are used for verifying that the SMF data that precedes the signature is correct. These signatures may be spread throughout the SMF data dump, with each signature being at the end of the data it is meant to verify.

To extract the archived data, a user issues an extraction instruction, and if the data is verified as correct, then the data is extracted.

BRIEF SUMMARY

A method for archiving and extracting data comprises monitoring a system management facility (SMF) data dump for signatures. A first history file is created and opened. Then, the data dump, which includes data and signatures, is written to the first history file while the first history file is still open. The first history file may be closed when all of the data and signatures of the data dump have been written to the first history file (i.e., the first history file is closed naturally). The first history file may also be closed when receiving an instruction for closing the first history file before all of the data and signatures of the data dump have been written to the first history file (i.e., the first history file is closed prematurely). If the first history file is prematurely closed, a second history file is created and opened, and the data and signatures of the data dump not written to the first history file are written to the second history file. The second history file is closed, and an indication of where the signatures are written is stored, where the indication is based on how the first history file was closed and the monitoring of the SMF data dump.

When extracting the data, the method receives a request to extract a subset of the data of the data dump. Then the method reads the indication of where the signatures corresponding to the subset of data to extract are written, and gathers the history files with the subset of data corresponding to the signatures. The method further verifies the subset of data of the gathered history files against the signatures, and any data that is verified as correct is extracted.

DETAILED DESCRIPTION

According to aspects of the present disclosure, archived system management facility (SMF) data may be verified against a signature, even if the data to be verified against the signature is split among two or more history files. When archiving an SMF data dump, an indication is kept that includes locations of signatures found while a system management facility (SMF) data dump is being archived. For example, the indication may be kept in metadata of the history file (e.g., in the history file itself, a status block outside the history file, a collective index, etc.). Then when extracting the archived data, if the data corresponding to a signature is in a different history file, the data corresponding to the signature from all of the history files is concatenated for verification.

Figure 1:
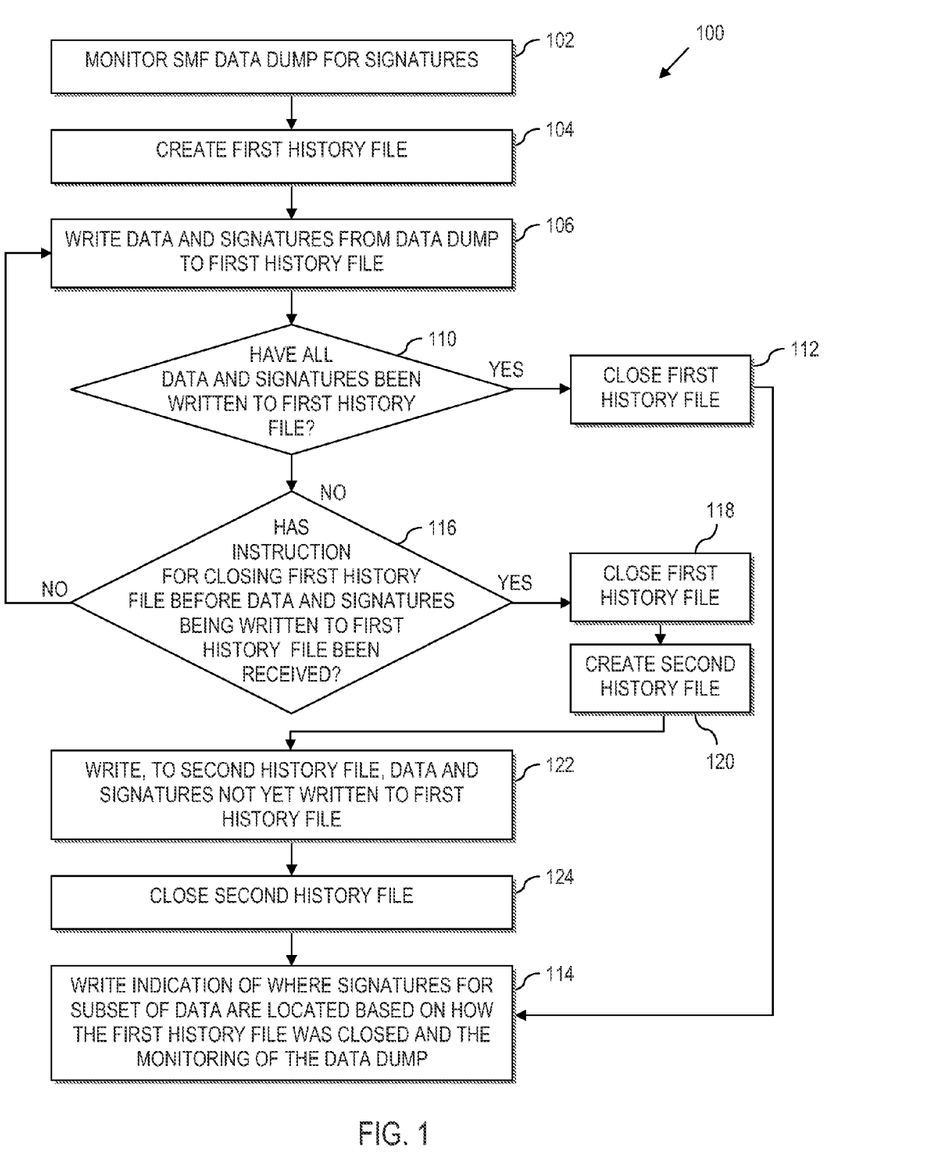
FIG. 1 is a flow chart illustrating an archival process for an SMF data dump with signatures, according to various aspects of the present disclosure.

Referring to the drawings and in particular to FIG. 1, a method 100 for archiving an SMF data dump is shown. SMF data dumps are atomic with regard to signature possibilities. In other words, once a data dump starts, either signatures are possible for the entire data dump or signatures are not possible for the entire data dump, and this will not change for the duration of the data dump. Further, this possibility of signatures is detectable through settings in the operating system from which the data dump originates. In other words, the possibility of signatures in a data dump may be known before any signatures are detected in the data dump itself.

At 102, the SMF data dump is monitored for signatures, and at 104 a first history file is created either in an opened state or created and then opened The data from the data dump is written to the first history file at 106, along with any signatures that are detected from the monitoring 102 above. As described below, the monitoring at 102 may be performed concurrently with creating the first history file at 104, the writing to the history file at 106, or both. Further, the first history file may be created before the monitoring of the data dump at 102.

At 110, a determination is made as to whether all of the data from the data dump, along with any signatures that may have been detected, have been written to the first history file. If all of the data and detected signatures have been written to the first history file, then at 112 the first history file is closed, and at 114, an indication of where any detected signatures are stored is written. In the case where the first history file is closed at 112, the indication would indicate that there are either no signatures in the first history file (if no signatures have been detected) or signatures are in the first history file (if one or more signatures are detected). The indication would also indicate that there are no other history files for this data dump.

However, at 110, if all of the data and all of any detected signatures have not been written to the first history file, then the method 100 proceeds to 116 where a determination is made as to whether an instruction for closing the first history file is received. For example, if the first history file is on a tape drive and the tape physically runs out before all of the data and signatures have been written to the first history file, then an end-of-volume (EOV) instruction may be received. As another example, the received instruction may be a soft cutoff instruction such as an end-of-day instruction (e.g., a DAYSTACK instruction from SMF Director). If the instruction for closing the first history file is not received then the method loops back to 106.

Thus, the method 100 continues to write data and any detected signatures from the data dump to the first history file until all of the data and signatures are written or an instruction to close the first history file is received as the method 100 loops through 106, 110, and 116. However, at 116, if the instruction for closing the first history file is received before all of the data and all of any detected signatures are written to the first history file (i.e., if the first history file is closed prematurely), then the first history file is closed at 118, and a second history file is created and opened at 120. At 122, starting where the first history file ended, data and signatures from the data dump are written to the second history file. In other words, data and signatures from the data dump not yet written to the first history file are written to the second history file. Eventually, the second history file is closed at 124, which is discussed in greater detail in reference to FIG. 2 below.

As described above, the method 100 writes at 114, an indication of where the signatures associated with the data dump are stored, e.g., based on how the first history file was closed and whether any signatures were detected. The indication may further be based on how the second history file was closed, whether signatures are possible for the data dump, or both. For example, temporary settings in a central work area may be monitored to determine if signatures are possible for the data dump, whether a signature was detected, whether a signature was written, etc.

Also, the indication may be written and stored in any practical way. For example, metadata for the history files may be stored on a one-to-one basis as a dump status block (i.e., one dump status block for each history file), in which a set of bits include information about the history file (e.g., three bits indicating: signatures are possible, a signature is included in the history file, and the history file was closed prematurely). This metadata of the history files may be stored within the history files themselves or as a separate file. As another example, the history files may have a common index that includes the metadata. Examples illustrating the method of FIG. 1 are included herein after the description of FIG. 2.

Figure 2:
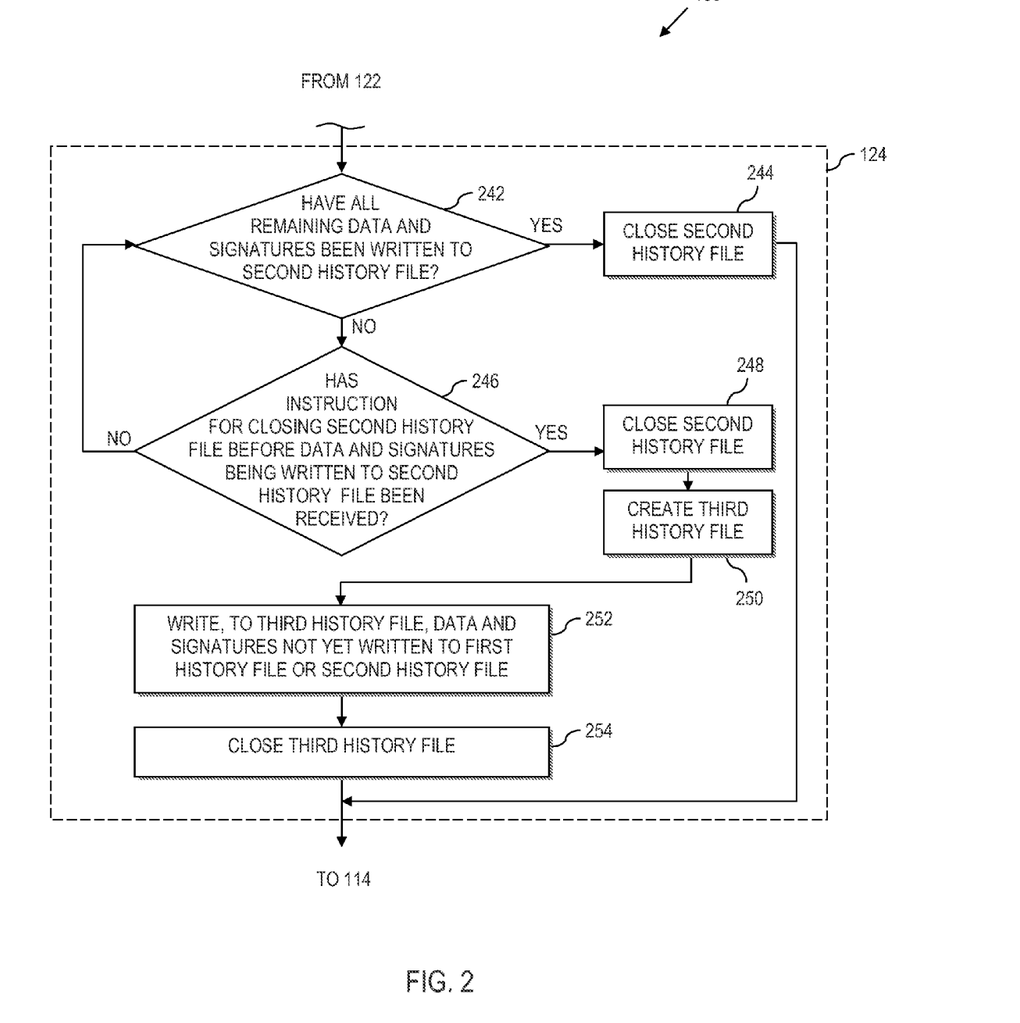
FIG. 2 is a flow chart illustrating closing a second history file and archiving in a third history file as part of the archival process of FIG. 1, according to various aspects of the present disclosure.

FIG. 2 is a flow chart illustrating an embodiment of the closing of the second history file of FIG. 1 (124, FIG. 1). As can be seen from FIG. 1 at 122, while the data and any found signatures are being written to the second history file, a check is made at 242 to determine whether all of the data from the data dump along with any signatures that may have been detected that have not been written to the first history file (i.e., remaining data and signatures), have been written to the second history file. If all of the remaining data and detected signatures have been written to the second history file, then at 244 the second history file is closed, and the method 100 proceeds to 114 (FIG. 1). In cases where the second history file is closed at 244, the indication would indicate that there are either no signatures in the second history file (if no signatures have been detected) or signatures are in the second history file (if signatures are written to the second history file). The indication would further indicate that no subsequent history files are associated with the data dump.

However, at 242, if all of the remaining data and all of any detected signatures have not been written to the second history file, then the method 100 proceeds to 246 where a determination is made on whether an instruction for closing the second history file is received (i.e., the second history file is to be closed prematurely). For example, if the second history file is on a tape drive and the tape physically runs out before all of the remaining data and signatures have been written to the second history file, then an end-of-volume (EOV) instruction may be received. As another example, the received instruction may be a soft cutoff instruction such as an end-of-day instruction (e.g., a DAYSTACK instruction from SMF Director).

If the instruction is not received then the method loops back to 242 and continues to write the remaining data and any detected signatures from the data dump to the second history file until all of the data and signatures are written or an instruction to close the second history file is received. However, at 246, if the instruction for closing the second history file is received before all of the remaining data and all of any detected signatures are written to the second history file (i.e., if the second history file is closed prematurely), then the second history file is closed at 248, and a third history file is opened at 250. At 252, starting where the second history file ended, data and signatures from the data dump are written to the third history file. In other words, data and signatures from the data dump not yet written to the second history file are written to the third history file. Eventually, the third history file is closed at 254, which may be similar to the determination on how the first and second history files are closed (i.e., 110, 112, 116-124 of FIG. 1 and 242-254 of FIG. 2), with or without creating a fourth history file, and so on.

Thus, with the method 100 of FIGS. 1-2, any number of history files may be used to store the data dump. However, in most cases, the maximum number of history files for a single data dump is three (e.g., one hard cutoff (e.g., EOV) and one soft cutoff (e.g., DAYSTACK)).

In the following eight non-limiting examples of the method 100 of FIGS. 1-2, the method of archiving data and signatures of an SMF data dump includes writing metadata on a one-to-one basis corresponding to a history file using three bits defined as: DSB0-2 (dump status block bits 0-2). DSB0 will be high when signatures are possible for the archived dump; DSB1 will be high if a signature is included in the history file associated with the DSB bits; and DSB2 will be high if the history file was closed prematurely, which indicates that a signature for data within the history file associated with the DSB bits may be located in a subsequent history file.

In the first example, signatures are not possible due to the version of the operating system from which the SMF dump comes. As such, all of the history files associated with the data dump will have DSB of "000".

In the rest of the examples, signatures are possible. In example two, the data from the SMF data dump is written to the first history file. Several signatures are detected throughout the data dump and are written to the first history file as well, and the first history file is not closed prematurely. As such, all of the data and signatures are successfully written to the first history file. As a result, the DSB bits for the first history file are "110", indicating that signatures are possible, at least one signature is located in the first history file, and the first history file did not close prematurely so a signature associated with data in the first history file is not located in a subsequent history file.

In a third example, data is written to a first history file and before any signatures are written to the first history file, the first history file is prematurely closed. Then, the rest of the data and seven signatures are written to the second history file, which is then closed because all of the data and signatures are archived. In this example, the DSB bits for the first history file would be "101" indicating that signatures are possible, no signatures are located in the first history file, and the first history file closed prematurely so a signature associated with data in the first history file may be located in a subsequent history file. The DSB bits for the second history file would be "110" indicating that signatures are possible, at least one signature is located in the second history file, and the second history file did not close prematurely so a signature associated with data in the second history file is not located in a subsequent history file.

In a fourth example, data and three signatures are written to a first history file, and the first history file is prematurely closed. Then, the rest of the data and eight signatures are written to the second history file, which is then closed because all of the data and signatures are archived. In this example, the DSB bits for the first history file would be "111" indicating that signatures are possible, at least one signature is located in the first history file, and the first history file closed prematurely so a signature associated with data in the first history file may be located in a subsequent history file. The DSB bits for the second history file would be "110" indicating that signatures are possible, at least one signature is located in the second history file, and the second history file did not close prematurely so a signature associated with data in the second history file is not located in a subsequent history file.

In a fifth example, data is written to a first history file and before any signatures are written to the first history file, the first history file is prematurely closed. Then, some data and two signatures are written to the second history file, and the second history file is prematurely closed. Subsequently, the rest of the data and two signatures are written to the third history file, which is then closed because all of the data and signatures are archived. In this example, the DSB bits for the first history file would be "101" indicating that signatures are possible, no signatures are located in the first history file, and the first history file closed prematurely so a signature associated with data in the first history file may be located in a subsequent history file. The DSB bits for the second history file would be "111" indicating that signatures are possible, at least one signature is located in the second history file, and the second history file also closed prematurely so a signature associated with data in the second history file may be located in a subsequent history file. The DSB bits for the third history file would be "110" indicating that signatures are possible, at least one signature is located in the third history file, and the third history file did not close prematurely so a signature associated with data in the third history file is not located in a subsequent history file.

In a sixth example, data is written to the first history file along with a signature, and more data is written to the first history file. Before another signature is written to the first history file, the first history file is prematurely closed due to an end-of-volume instruction. Data is written to a newly opened second history file, but before any signatures are written to the second history file, the second history file is prematurely closed due to a DAYSTACK instruction. Then, data is written to a newly opened third history file, along with the signature for the data written since the last signature was written (in the first history file). More data and signatures are then written to the third history file, which closes when all of the data and signatures have been written. In this example, the DSB bits for the first history file would be "111" indicating that signatures are possible, at least one signature is located in the first history file, and the first history file closed prematurely so a signature associated with data in the first history file may be located in a subsequent history file. The DSB bits for the second history file would be "101" indicating that signatures are possible, no signatures are located in the second history file, and the second history file closed prematurely so a signature associated with data in the second history file may be located in a subsequent history file. The DSB bits for the third history file would be "110" indicating that signatures are possible, at least one signature is located in the third history file, and the third history file did not close prematurely so a signature associated with data in the third history file is not located in a subsequent history file.

In a seventh example, data is written to the first history file, but before a signature is written to the first history file, the first history file is prematurely closed due to an end-of-volume instruction. Then, data is written to a newly opened second history file, but before any signatures are written to the second history file, the second history file is prematurely closed due to a DAYSTACK instruction. Subsequently, data is written to a newly opened third history file, along with the signature for the data. More data and signatures are then written to the third history file, which closes when all of the data and signatures have been written. In this example, the DSB bits for the first history file would be "101" indicating that signatures are possible, no signatures are located in the first history file, and the first history file closed prematurely so a signature associated with data in the first history file may be located in a subsequent history file. The DSB bits for the second history file would be "101" indicating that signatures are possible, no signatures are located in the second history file, and the second history file closed prematurely so a signature associated with data in the second history file may be located in a subsequent history file. The DSB bits for the third history file would be "110" indicating that signatures are possible, at least one signature is located in the third history file, and the third history file did not close prematurely so a signature associated with data in the third history file is not located in a subsequent history file.

In an eighth example, data associated with two signatures and the two signatures are written to a first history file, and the first history file is prematurely closed such that the last item written to the first history file is the second signature. Data and signatures are then written to a newly opened second history file, which is prematurely closed such that the last item written to the second history file is a portion of data associated with a signature not yet written. Then, the rest of the data associated with the unwritten signature is written to a newly opened third history file, along with more data and signatures associated with that data. In this example, the DSB bits for the first history file would be "111" indicating that signatures are possible, at least one signature is located in the first history file, and the first history file closed prematurely so a signature associated with data in the first history file may be located in a subsequent history file. The DSB bits for the second history file would be "111" indicating that signatures are possible, at least one signature is located in the second history file, and the second history file also closed prematurely so a signature associated with data in the second history file may be located in a subsequent history file. The DSB bits for the third history file would be "110" indicating that signatures are possible, at least one signature is located in the third history file, and the third history file did not close prematurely so a signature associated with data in the third history file is not located in a subsequent history file.

Figure 3:
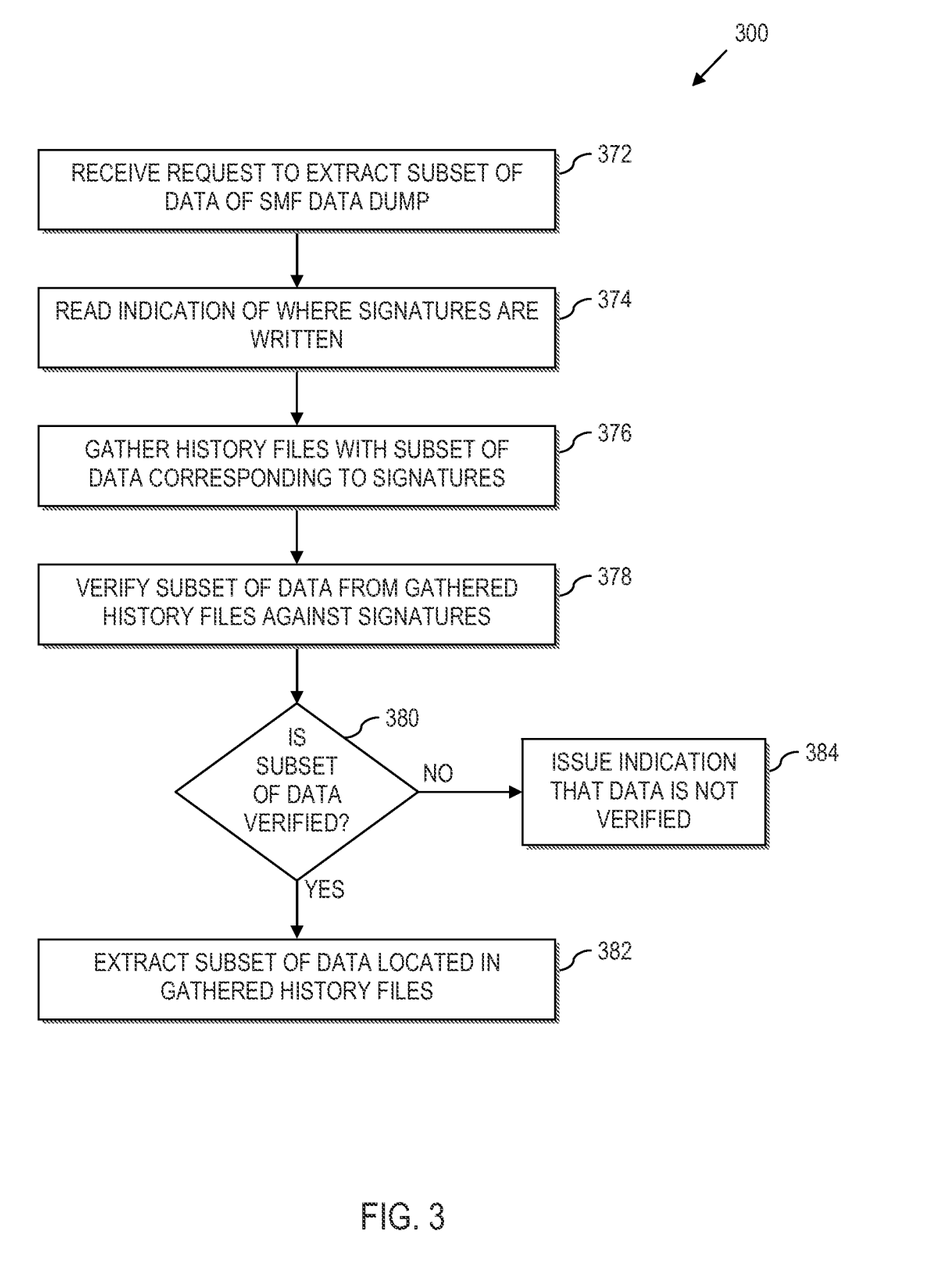
FIG. 3 is a flow chart illustrating an extraction process for an SMF data dump with signatures, according to various aspects of the present disclosure.

FIG. 3 illustrates a method 300 for extracting data that was archived using the method 100 of FIGS. 1-2. At 372, a request to extract a subset of data from the archived data is received. At 374, the indication of where the signatures are stored (from 114, FIG. 1) is read. For example, in the eight examples above, the data status block indicates where the signatures are through the DSB bits, so in those examples, the data status block would be read. Through those DSB bits, the history files that include the subset of data (and the signatures) may be identified. At 376, those identified history files are gathered, and the subset of data is verified against the signatures at 378. If at 380 the subset of data is verified to be correct, then at 382 the subset of data is extracted for the user. If at 380 the subset of data is not verified to be correct, then an indication may be issued that the data is not verified.

Using some of the examples above, the following are non-limiting examples of the method of 300 of FIG. 3. Also, assume for simplicity that the subset of archived data requested is an entire dump. In the first example above, signatures were not possible. As such, during an extraction for data from that dump, the DSB bits indicate that signatures are not possible. Therefore, the method of FIG. 3 is not applicable, and the data will be extracted without verification.

In the third example above, the DSB bits indicate that there are no signatures in the first history file, but there are signatures in the second history file and no history files after the second history file. As such, both the first and second history files are gathered. For the first signature found in the second history file, all of the archived data from the first history file is concatenated with the data in the second history file that precedes the first signature, and the resulting concatenated data is verified against the first signature. The data between the first and second signatures is verified against the second signature, the data between the second and third signatures is verified against the third signature, and so on. All verified data is extracted.

In the sixth example above, the DSB bits for the first history file are read (111), which indicate that there is at least one signature in the first history file and that the first history file was prematurely closed, so there will be a second history file. Further, the DSB bits for the second history file are read (101), which indicate that there are no signatures in the second history file and that the second history file was also prematurely closed, so there will be a third history file. Then, the DSB bits for the third history file are read (110), which indicate that there is at least one signature in the third history file and that the third history file was not prematurely closed, so there will be no more history files for this archived dump. The three history files are gathered. The data before the first signature is verified against the first signature. The rest of the data in the first history file is concatenated with the data from the second history file and further is concatenated with the data in the third history file preceding the second signature of the data dump (i.e., the first signature in the third history file). That concatenated data is verified against the second signature. The rest of the data is verified against the corresponding signatures, and all verified data is extracted.

The second, fourth, fifth, seventh, and eighth examples above follow the same methodology of the extraction examples above. Thus, whenever data for a signature is found in a history file other than the history file that includes the signature, the data corresponding to the signature (i.e., data between the signature used to verify the data and the preceding signature or the beginning of the data dump if there is no preceding signature) from the other history files is concatenated.

While the above examples use an entire dump as a subset, the subset may be less than an entire dump. For example, the requested subset for extraction may be a certain time slice that is less than an entire dump. Further, the requested subset may span one or more dumps. For example, the requested data may start halfway through an archived dump and end partway through another dump. In any case, the same method described above will be used.

Using the novel methods described herein, if data for a signature spans one or more history files, then the data may be concatenated when verifying the data against the signature. As such, the method helps eliminate errors in verification that may occur if some of the data is not gathered when verifying. Further, the determination of where the signatures are may be made by reading the indication instead of reading through all of the archived data, which speeds up the extraction process.

Figure 4:
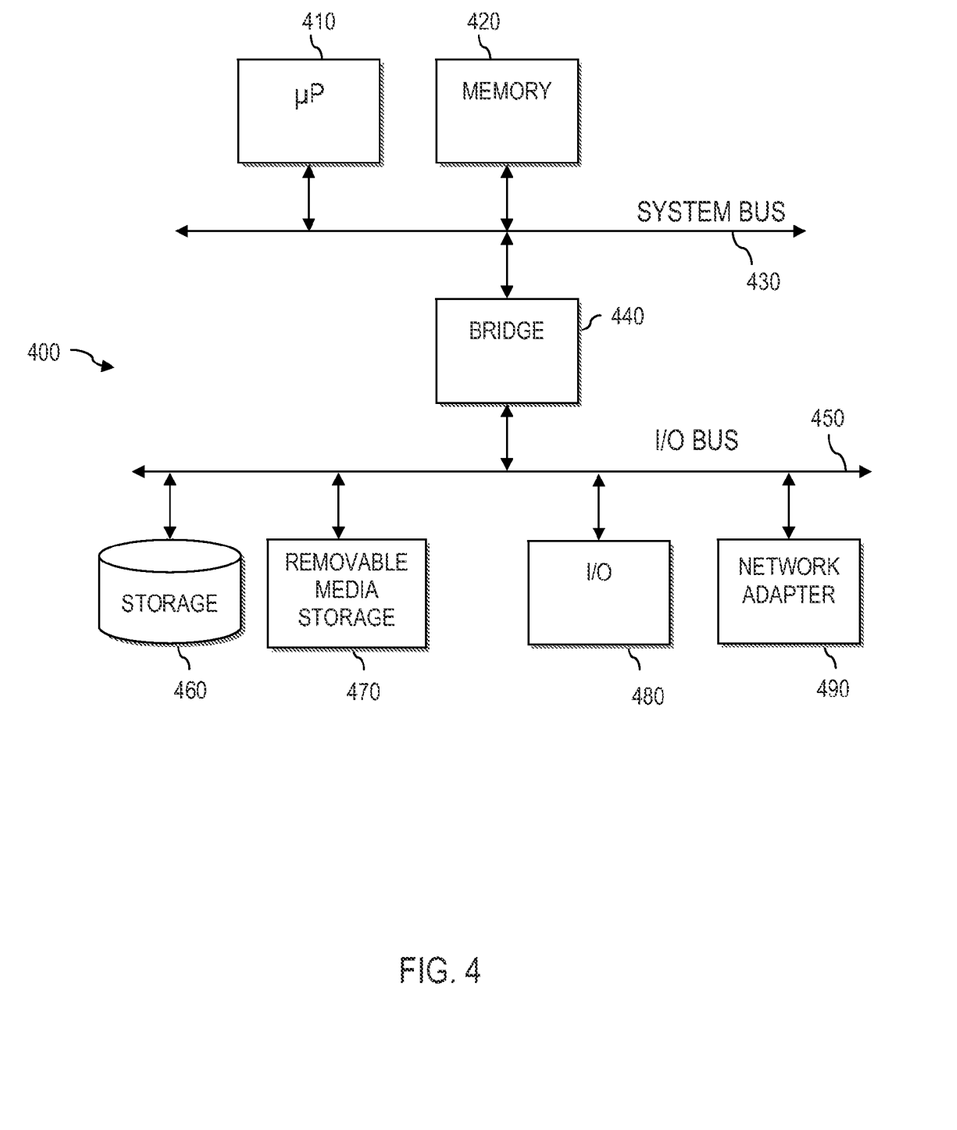
FIG. 4 is a block diagram of a computer system having a computer readable storage medium for implementing functions according to various aspects of the present disclosure as described in greater detail herein.

Referring to FIG. 4, a block diagram of an exemplary computer system is illustrated. The computer system 400 includes one or more microprocessors 410 that are connected to memory 420 via a system bus 430. A bridge 440 connects the system bus 430 to an I/O Bus 450 that links peripheral devices to the microprocessor(s) 410. Peripherals may include storage 460, such as a hard drive, removable media storage 470, e.g., tape drive, floppy, flash, CD and/or DVD drive, I/O device(s) 480 such as a keyboard, mouse, etc., and a network adapter 490. In this regard, the microprocessor(s) 410 may thus read computer instructions or otherwise interact with data and other information placed on the system bus 430, e.g., via information stored in the memory 420, stored in the storage 460, stored on the removable media storage 470, entered via the I/O 480, received from the network adapter 490, or combinations thereof, to implement one or more of the aspects, as set out in greater detail herein.

For instance, computer usable program code stored in memory 420 may be executed by the microprocessor 410 to implement any aspect of the present invention, for example, to implement any aspect of any of the methods and/or system components illustrated in FIGS. 1-3.

An object oriented programming system such as Java may run in conjunction with the operating system and provides calls to the operating system from Java programs or applications executing on data processing system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. However, a computer readable storage medium does not include anything described below as a computer readable signal medium.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. Aspects of the invention were chosen and described in order to best explain the principles of the invention and the practical application, and to enable others of ordinary skill in the art to understand the invention for various embodiments with various modifications as are suited to the particular use contemplated.

What is claimed is:

1. A method for archiving and extracting data, the method comprising:
   monitoring a data dump including data for signatures;
   creating a first history file;
   writing the data dump including the data and signatures to the first history file if the first history file is open;
   closing the first history file upon a select one of:

identifying that all of the data and signatures of the data dump have been written to the first history file; and receiving an instruction for closing the first history file before all of the data and signatures of the data dump have been written to the first history file;

performing when receiving an instruction for closing the first history file before the entire data dump is written to the first history file:

creating a second history file;

writing, to the second history file, the data and signatures of the data dump not written to the first history file; and closing the second history file;

writing an indication of where the signatures are written based on how the first history file was closed and the monitoring of the data dump;

receiving a request to extract a subset of the data of the data dump;

reading the indication of where the signatures corresponding to the subset of data to extract are written;

gathering the history files with the subset of data corresponding to the signatures;

verifying the subset of data of the gathered history files against the signatures; and extracting the subset of data located in the gathered history files if the subset of data is verified.

2. The method of claim 1, wherein closing the first history file when receiving an instruction for closing the first history file further includes closing the first history file when receiving an end-of-volume instruction indicating a physical end of a volume on which the first history file is stored.

3. The method of claim 1, wherein closing the first history file when receiving an instruction for closing the first history file further includes closing the first history file when receiving a soft cutoff for the first history file.

4. The method of claim 3, wherein receiving a soft cutoff for the first history file includes receiving an end-of-day boundary for the first history file.

5. The method of claim 1, wherein writing an indication of where the signatures are written based on how the first history file was closed and the monitoring of the data dump includes storing, in metadata of the first history file, an indication of whether any signature is stored in the first history file.

6. The method of claim 1, wherein writing an indication of where the signatures are written based on how the first history file was closed and the monitoring of the data dump includes storing, in metadata of the first history file, an indication of whether a signature corresponding with data in the first history file may be located in the second history file.

7. The method of claim 1, wherein writing an indication of where the signatures are written based on how the first history file was closed and the monitoring of the data dump includes:

storing, in metadata of the first history file, an indication whether any signatures are stored in the first history file and an indication that the signature may be stored in a different history file; and storing, in metadata of the second history file, an indication of whether any signatures are stored in the second history file.

8. The method of claim 7, wherein:

gathering the history files with the subset of data corresponding to the signature further includes gathering the first history file and the second history file;

verifying the subset of data of the gathered history files against the signatures further includes verifying the subset of data from the first history file and the second history file against the signature corresponding to the subset of data; and extracting the subset of data located in the gathered history files if the subset of data is verified further includes extracting the subset of data from the first history file and the second history file if the subset of data is verified.

9. The method of claim 1, wherein:

closing the second history file further includes closing the second history file upon a select one of:

identifying that all of the data and signatures of the data dump not written to the first history file have been written to the second history file; and receiving an instruction for closing the second history file before all of the data and signatures of the data dump not written to the first history file have been written to the second history file;

further including:

performing when receiving an instruction for closing the second history file before all of the data and signatures of the data dump not written to the first history file have been written to the second history file:

creating a third history file;

writing, to the third history file, data and signatures of the data dump not written to the first history file or the second history file; and closing the third history file;

wherein writing an indication of where the signatures are written based on how the first history file was closed and the monitoring of the data dump includes:

storing, in metadata of the first history file, an indication whether any signatures are stored in the first history file and an indication that the signature may be stored in a different history file;

storing, in metadata of the second history file, an indication whether any signatures are stored in the second history file and an indication that the signature may be stored in a different history file; and storing, in metadata of the third history file, an indication of whether any signatures are stored in the third history file.

10. The method of claim 9, wherein:

gathering the history files with the subset of data corresponding to the signatures further includes gathering the first history file, the second history file, and the third history file;

verifying the subset of data of the gathered history files against the signature further includes verifying the subset of data from the first history file, the second history file, and the third history file against the signature corresponding to the subset of data; and extracting the subset of data located in the gathered history files if the subset of data is verified further includes extracting the subset of data from the first history file, the second history file, and the third history file if the subset of data is verified.

11. The method of claim 1, wherein:

writing an indication of where the signatures are written based on how the first history file was closed and the monitoring of the data dump further includes writing an indication of where the signature is written based on how the first and second history files were closed.

12. The method of claim 1 further including issuing an indication that the subset of data is not verified if the subset of data is not verified.

13. A method of extracting data from an archived system management facility (SMF) data dump, the method comprising:
- reading an indication of where the signatures corresponding to the subset of data are written by determining if signatures are not possible for the requested subset of data;
- reading an indication of where signatures corresponding to the subset of data are written;
- gathering history files with the subset of data corresponding to the signatures by gathering history files with the subset of data if signatures are not possible for the requested subset of data;
- verifying the subset of data of the gathered history files against the signatures by verifying the subset of data of the gathered history files against the signatures only if signatures are possible for the requested subset of data; and
- extracting the subset of data located in the gathered history files if the subset of data is verified by extracting the subset of data located in the gathered history files if signatures are not possible for the requested subset of data.

14. A method of extracting data from an archived system management facility (SMF) data dump, the method comprising:
- receiving a request to extract a subset of data;
- reading an indication of where signatures corresponding to the subset of data to extract are written further includes reading metadata of history files to determine which history files include the signatures corresponding to the subset of data to be extracted;
- gathering history files with the subset of data corresponding to the signatures;
- verifying the subset of data of the gathered history files against the signatures; and
- extracting the subset of data located in the gathered history files if the subset of data is verified.

15. The method of claim 14, wherein:
- gathering history files with the subset of data corresponding to the signatures further includes gathering a first history file and a second history file, wherein a signature corresponding to a subset of data at least partially stored in the first history file is located in the second history file;
- verifying the subset of data of the gathered history files against the signature further includes verifying a subset of data at least partially stored in the first history file and data of the second history file corresponding to the signature corresponding to a subset of data at least partially stored in the first history file against the signature corresponding to a subset of data at least partially stored in the first history file; and
- extracting the subset of data located in the gathered history files if the subset of data is verified further includes extracting the subset of data from the first history file and the second history file if the subset of data is verified.

16. The method of claim 14, wherein:
- gathering history files with the subset of data corresponding to the signatures further includes gathering a first history file, a second history file, and a third history file, wherein a signature corresponding to a subset of data at least partially stored in the first history file and second history file is located in the third history file;
- verifying the subset of data of the gathered history files against the signature further includes verifying a subset of data at least partially stored in the first history file and the second history file, data of the second history file, and data of the third history file corresponding to the signature corresponding to a subset of data at least partially stored in the first history file and second history file against the signature corresponding to a subset of data at least partially stored in the first history file and second history file; and
- extracting the subset of data located in the gathered history files if the subset of data is verified further includes extracting the subset of data from the first history file, the second history file, and the third history file if the subset of data is verified.

17. The method of claim 14, wherein:
- gathering history files with the subset of data corresponding to the signatures further includes:
  - gathering a first history file and a second history file, wherein a signature corresponding to a subset of data at least partially stored in the first history file is located in the second history file; and
  - gathering a third history file, wherein a signature corresponding to a subset of data at least partially stored in the second history file is located in the third history file;
- verifying the subset of data of the gathered history files against the signature further includes:
  - verifying a subset of data at least partially stored in the first history file and data of the second history file corresponding to the signature corresponding to a subset of data at least partially stored in the first history file against the signature corresponding to a subset of data at least partially stored in the first history file; and
  - verifying a subset of data at least partially stored in the second history file and data of the third history file corresponding to the signature corresponding to a subset of data at least partially stored in the second history file against the signature corresponding to a subset of data at least partially stored in the second history file; and
- extracting the subset of data located in the gathered history files if the subsets of data are verified further includes extracting the subset of data from the first history file, the second history file, and the third history file if the subset of data is verified.

18. A method for archiving and extracting data, the method comprising:
- monitoring a system management facility (SMF) data dump including data for a signature;
- creating a first history file;
- writing the data dump including the data and the signature to the first history file if the first history file is open;
- closing the first history file when select one of:
  - all of the data and the signature of the data dump have been written to the first history file; and
  - receiving an instruction for closing the first history file before all of the data and the signature of the data dump have been written to the first history file;
- performing when receiving an instruction for closing the first history file before the entire data dump is written to the first history file:
  - creating a second history file;
  - writing, to the second history file, the data and the signature of the data dump not written to the first history file; and
  - closing the second history file; and writing an indication of where the signature is written based on how the first history file was closed.

19. The method of claim 18 further including:

receiving a request to extract the data of the data dump;
reading the indication of where the signature is written;
gathering the history files with the data;
verifying the data of the gathered history files against the signature; and
extracting the data located in the gathered history files if the subset of data is verified.

* * * * *